United States Patent [19]

Strout, II et al.

[11] Patent Number: 5,193,187

[45] Date of Patent: Mar. 9, 1993

[54] FAST INTERRUPT MECHANISM FOR INTERRUPTING PROCESSORS IN PARALLEL IN A MULTIPROCESSOR SYSTEM WHEREIN PROCESSORS ARE ASSIGNED PROCESS ID NUMBERS

[75] Inventors: Robert E. Strout, II, Livermore, Calif.; George A. Spix, Eau Claire, Wis.; Edward C. Miller, Eau Claire, Wis.; Anthony R. Schooler, Eau Claire, Wis.; Alexander A. Silbey, Eau Claire; Andrew E. Phelps, Eau Claire, Wis.; Brian D. Vanderwarn, Eau Claire, Wis.; Gregory G. Gaertner, Eau Claire, Wis.

[73] Assignee: Supercomputer Systems Limited Partnership, Eau Claire, Wis.

[21] Appl. No.: 898,387

[22] Filed: Jun. 10, 1992

Related U.S. Application Data

[63] Continuation of Ser. No. 536,199, Jun. 11, 1990, abandoned, which is a continuation-in-part of Ser. No. 459,083, Dec. 29, 1989.

[51] Int. Cl.$^5$ ............................................. G06F 9/46
[52] U.S. Cl. ......................... 395/650; 364/DIG. 1; 364/281.4; 364/281.7; 364/230.2; 395/575
[58] Field of Search .................. 395/650; 364/DIG. 1

[56] References Cited

U.S. PATENT DOCUMENTS

| | | | |
|---|---|---|---|
| 3,048,332 | 9/1962 | Brooks et al. | |
| 3,876,987 | 4/1975 | Dalton et al. | 364/200 |
| 4,543,630 | 9/1985 | Neches | 364/200 |
| 4,636,942 | 1/1987 | Chen et al. | 364/200 |
| 4,718,006 | 1/1988 | Nishida | 364/200 |
| 4,736,319 | 4/1988 | Dasbuysta | 364/200 |
| 4,745,545 | 5/1988 | Schiffleger | 364/200 |
| 4,754,398 | 6/1988 | Pribnow | 364/200 |
| 4,796,176 | 1/1989 | D'Amico et al. | 364/200 |
| 4,807,116 | 2/1989 | Katzman et al. | 364/200 |
| 4,816,990 | 3/1989 | Williams | 364/200 |
| 4,839,800 | 6/1989 | Barlow et al. | 364/200 |
| 4,845,722 | 7/1989 | Kent et al. | 364/200 |
| 4,891,751 | 1/1990 | Call et al. | 364/200 |
| 4,901,231 | 2/1990 | Bishop et al. | 364/200 |
| 4,905,145 | 2/1990 | Sauber | 364/200 |
| 4,914,570 | 4/1990 | Peacock | 364/200 |
| 4,920,485 | 4/1990 | Vahidsafa | 364/200 |
| 4,937,733 | 6/1990 | Gillett, Jr. et al. | 364/200 |
| 4,959,781 | 9/1990 | Rubinstein et al. | 364/200 |
| 5,003,466 | 3/1991 | Schan, Jr. et al. | 364/200 |
| 5,016,162 | 5/1991 | Epstein et al. | 364/200 |
| 5,016,167 | 5/1991 | Nguyen et al. | 364/200 |
| 5,062,040 | 10/1991 | Bishop et al. | 364/DIG. 1 |

*Primary Examiner*—Lawrence E. Anderson
*Attorney, Agent, or Firm*—Patterson & Keough

[57] ABSTRACT

A fast interrupt mechanism is capable of simultaneously interrupting a community of associated processors in a multiprocessor system. The fast interrupt mechanism enables the more effective debugging of software executing on a multiprocessor system by allowing all of the processors in a community associated with a parallel process to be halted within a limited number of clock cycles following a hardware exception or processor breakpoint. The fast interrupt mechanism consists of a set of registers that are used to identify associations among multiple processors, a comparison matrix that is used to select processors to be interrupted, a network of interconnections that transmit interrupt events to and from the processors, and elements in the processors that create and respond to fast interrupt events.

19 Claims, 16 Drawing Sheets

Fig. 4a

PROCESSOR SETN ADDRESS

| | CLUSTER 0 | CLUSTER 1 | CLUSTER 2 | CLUSTER 3 |
|---|---|---|---|---|
| SETN0 | 8008 | A000 | C000 | E000 |
| SETN1 | 8008 | A008 | C008 | E008 |
| SETN2 | 8010 | A010 | C010 | E010 |
| SETN3 | 8018 | A018 | C018 | E018 |
| ⋮ | | | | |
| SETN30 | 80F0 | A0F0 | C0F0 | E0F0 |
| SETN31 | 80F8 | A0F8 | C0F8 | E0F8 |
| SETI | 8100 | A100 | C100 | E100 |

Fig. 4b

I/O DEVICE SETN ADDRESSES

| | CLUSTER 0 | CLUSTER 1 | CLUSTER 2 | CLUSTER 3 |
|---|---|---|---|---|
| SETN0 | 000002000 | 100002000 | 200002000 | 300002000 |
| SETN1 | 000002008 | 100002008 | 200002008 | 300002008 |
| SETN2 | 000002010 | 100002010 | 200002010 | 300002010 |
| SETN3 | 000002018 | 100002018 | 200002018 | 300002018 |
| ⋮ | | | | |
| SETN30 | 0000020F0 | 1000020F0 | 2000020F0 | 3000020F0 |
| SETN31 | 0000020F8 | 1000020F8 | 2000020F8 | 3000020F8 |
| SETI | 000002100 | 100002100 | 200002100 | 300002100 |

Fig. 6a

SM: SYSTEM MODE (16 BITS)
NOT USER WRITABLE.

| BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|
| DT3 | DT2 | DT1 | DT0 | DFI |  |  |  |  | DEX |  | FIRM |  |  |  |  |

THIS REGISTER IS SAVED IN OSM AND THEN SET TO ALL ONES ON AN INTERRUPT, SYSTEM CALL, OR EXCEPTION. IT IS RESTORED FROM OSM BY THE RTT INSTRUCTION.

FIRM: 1=FAST INTERRUPT REQUESTS MASKED, 0=ENABLE. THIS BIT PREVENTS AN EXCEPTION (AS REPORTED IN EXCEPTION STATUS) OR A FAIR INSTRUCTION FROM CAUSING A FAST INTERRUPT REQUEST.

DEX: 1=DISABLE CONTEXT SWITCH ON ES REGISTER NON-ZERO, 0=ENABLE

DFI: 1=DISABLE INCOMING FAST INTERRUPT, 0=ENABLE.

DT0: 1=DISABLE TYPE 0 SIGNALS, 0=ENABLE.

DT1: 1=DISABLE TYPE 1 SIGNALS, 0=ENABLE.

DT2: 1=DISABLE TYPE 2 SIGNALS, 0=ENABLE.

DT3: 1=DISABLE TYPE 3 SIGNALS, 0=ENABLE.

Fig. 6b

PI: PENDING INTERRUPTS (16 BITS)
NOT USER WRITABLE.

THIS REGISTER SHOWS THE STATUS OF INCOMING INTERRUPTS.

| BIT 15 | BIT 14 | BIT 13 | BIT 12 | BIT 11 | BIT 10 | BIT 9 | | BIT 0 |
|---|---|---|---|---|---|---|---|---|
| T3 | T2 | T1 | T0 | FI | | UNDEFINED | | |

FI: 1=FAST INTERRUPT SIGNAL HAS BEEN RECEIVED, 0=NO SIGNAL

T0: 1=TYPE 0 SIGNAL HAS BEEN RECEIVED, 0=NO SIGNAL

T1: 1=TYPE 1 SIGNAL HAS BEEN RECEIVED, 0=NO SIGNAL

T2: 1=TYPE 2 SIGNAL HAS BEEN RECEIVED, 0=NO SIGNAL

T3: 1=TYPE 3 SIGNAL HAS BEEN RECEIVED, 0=NO SIGNAL

WHEN READ, THE REGISTER SHOWS WHICH INTERRUPTS ARE PENDING. READING THE REGISTER CLEARS ALL BITS TO ZERO. WHEN WRITTEN, WRITING A ZERO HAS NO EFFECT ON THE STATE OF ANY BIT. WRITING A ONE IN ANY BIT POSITION WILL SET THAT BIT TO ONE.

Fig. 6c

UM: USER MODE (16 BITS)
USER WRITABLE.

| BIT 15 | BIT 14 | BIT 13 | BIT 12 | BIT 11 | BIT 10 | BIT 9 | BIT 8 | BIT 7 | BIT 6 |
|---|---|---|---|---|---|---|---|---|---|
| undf | undf | undf | undf | EINV | EFDN | EDBZ | EIOVF | ESNAN | EQNAN |

| BIT 5 | BIT 4 | BIT 3 | BIT 2 | BIT 1 | BIT 0 |
|---|---|---|---|---|---|
| EINF | EINX | EUNF | EFOVF | EOME | undf |

EOME: ENABLE TRAP ON OPERAND MAPPING ERROR, OR MEMORY WRITE PROTECT ERROR. (WHEN SUCH AN ERROR OCCURS, A WRITE CANNOT MODIFY MEMORY AND A READ WILL NOT RETURN VALID DATA, REGARDLESS OF THE STATE OF THIS BIT.)

EFOVF: ENABLE TRAP ON FLOATING POINT OVERFLOW

ENUF: ENABLE TRAP ON UNDERFLOW

EINX: ENABLE TRAP ON INEXACT RESULT

EINF: ENABLE TRAP WHEN AN OPERAND IS AN INFINITY

EQNAN: ENABLE TRAP WHEN AN OPERAND IS A QUIET NaN

ESNAN: ENABLE TRAP WHEN AN OPERAND IS A SIGNALING NaN

EIOVF: ENABLE TRAP ON INTEGER OVERFLOW

EDBZ: ENABLE TRAP ON DIVISION BY ZERO

EFDN: ENABLE TRAP WHEN A DENORMALIZED NUMBER IS FLUSHED TO ZERO

EINV: ENABLE TRAP ON INVALID FLOATING-POINT OPERATION

Fig. 6d

ES: EXCEPTION STATUS (24 BITS)
NOT USER WRITABLE.

| BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|
| INVE | FDNE | DBZE | IOVFE | SNANE | QNANE | INFE | INXE | UNFE | FOVFE | OMEE | undf |

| BIT 23 | BIT 22 | BIT 21 | BIT 20 | BIT 19 | BIT 18 | BIT 17 | BIT 16 | BIT 15 | BIT 14 | BIT 13 | BIT 12 |
|---|---|---|---|---|---|---|---|---|---|---|---|
| WAE | IMEE | OWPE | IIE | AE | DJE | IPE | ISME | undf | undf | undf | undf |

A BIT WILL BE SET IN THIS REGISTER WHEN AN EXCEPTION HAS OCCURED WITH ITS TRAP ENABLE BIT SET, OR AN EXCEPTION OCCURS WHICH DOES NOT HAVE A TRAP ENABLE BIT. BITS ARE ONLY CLEARED BY AN EXPLICIT MOVE TO THE CONTROL REGISTER. IF THIS REGISTER IS NONZERO AT A TIME WHEN THE DEX (DISABLE EXCEPTIONS) BIT IN SM IS ZERO, AN EXCEPTION CONTEXT SWITCH WILL OCCUR.

| | |
|---|---|
| OMEE: | OPERAND MAPPING ERROR EXCEPTION. |
| FOVFE: | FLOATING-POINT OVERFLOW EXCEPTION. |
| UNFE: | UNDERFLOW EXCEPTION. |
| INXE: | INEXACT RESULT EXCEPTION. |
| INFE: | INFINITY OPERAND EXCEPTION. |
| QNANE: | QUIET NaN OPERAND OPERATION. |
| SNANE: | SIGNALING NaN OPERAND EXCEPTION. |
| IOVFE: | INTEGER OVERFLOW EXCEPTION. |
| DBZE: | DIVIDE BY ZERO EXCEPTION. |
| FDNE: | DENORMALIZED NUMBER FLUSHED TO ZERO EXCEPTION. |
| INVE: | INVALID FLOATING-POINT OPERATION EXCEPTION. |
| ISME: | INVALID SM EXCEPTION. |
| IPE: | INSTRUCTION PRIVILEGE EXCEPTION. |
| DJE: | DELAYED-JUMP TRAP INSTRUCTION EXCEPTION. |
| AE: | ALIGNMENT (TWO-PARCEL INSTRUCTION NOT ON WORD BOUNDARY) EXCEPTION. |
| IIE: | ILLEGAL INSTRUCTION EXCEPTION. |
| OWPE: | OPERAND WRITE PROTECT VIOLATION EXCEPTION. |
| IMEE: | INSTRUCTION MAPPING ERROR EXCEPTION. |
| WAE: | WATCHPOINT ADDRESS EXCEPTION. |

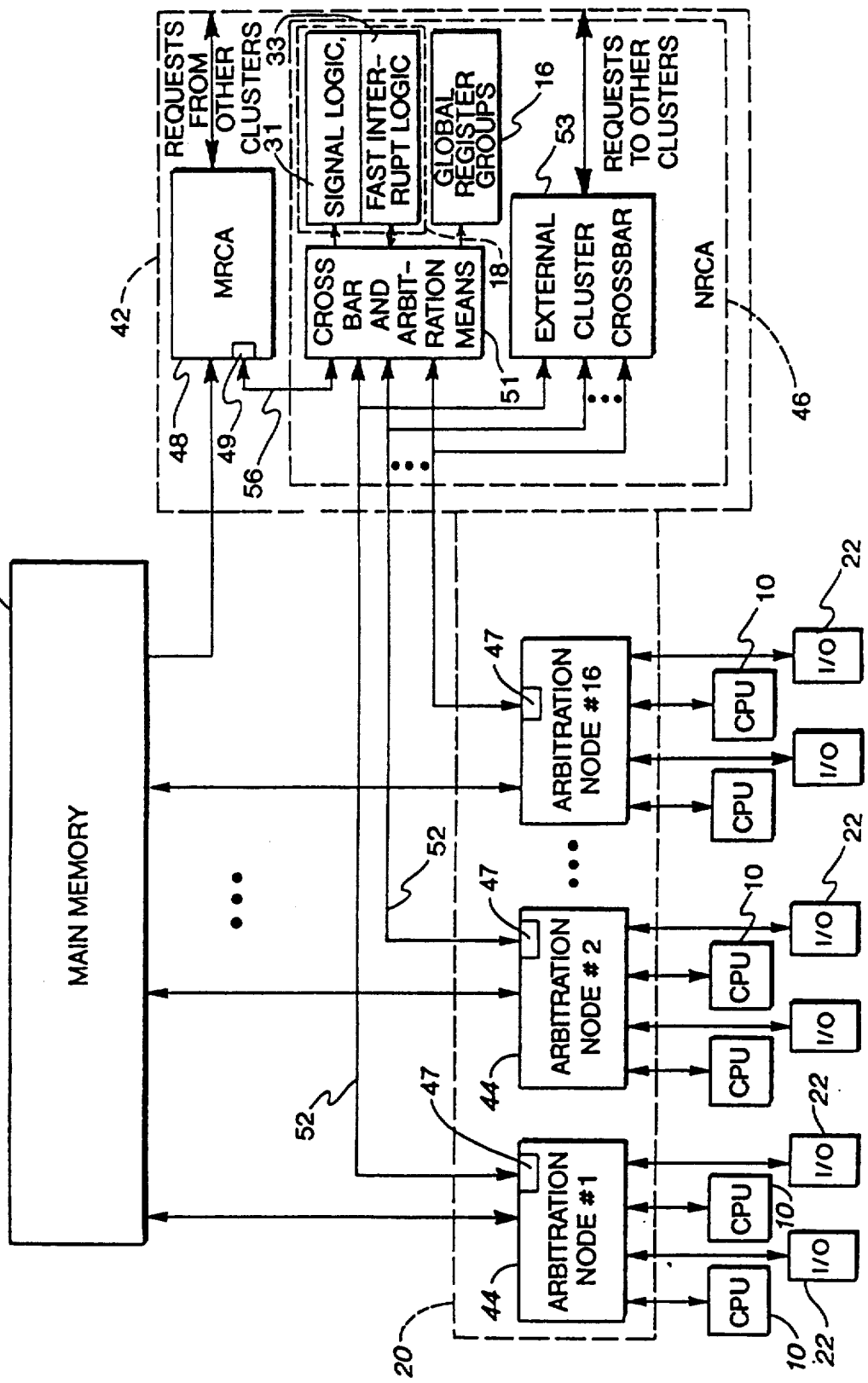

PHYSICAL ADDRESS MAP AS USED AT THE NRCA AND AT THE I/O CONCENTRATOR MEANS

FAST INTERRUPT MECHANISM FOR INTERRUPTING PROCESSORS IN PARALLEL IN A MULTIPROCESSOR SYSTEM WHEREIN PROCESSORS ARE ASSIGNED PROCESS ID NUMBERS

RELATED APPLICATION

This application is a continuation of Ser. No. 536199, filed Jun. 11, 1990, now abandoned, which is a continuation-in-part of an application filed in the United States Patent and Trademark Office on Dec. 29, 1989, entitled CLUSTER ARCHITECTURE FOR A HIGHLY PARALLEL SCALAR/VECTOR MULTIPROCESSOR SYSTEM, Ser. No. 07/459,083, pending, and assigned to the assignee of the present invention, which is hereby incorporated by reference in the present application. This application is also related to copending application filed in the United States Patent and Trademark Office concurrently herewith, entitled, DISTRIBUTED INPUT/OUTPUT ARCHITECTURE FOR A MULTIPROCESSOR SYSTEM, Ser. No. 07/536,182, pending which is assigned to the assignee of the present invention, and a copy of which is attached and hereby incorporated in the present application.

TECHNICAL FIELD

This invention relates generally to the field of signaling and interrupt mechanisms for computer and electronic logic systems. More particularly, the present invention relates to a method and apparatus for simultaneously performing a fast interrupt on a community of associated processors in a multiprocessor system.

BACKGROUND ART

The parent application identified above describes a new cluster architecture for high-speed computer processing systems, referred to as supercomputers. For most supercomputer applications, the objective is to provide a computer processing system with the fastest processing speed and the greatest processing flexibility, i.e., the ability to process a large variety of traditional application programs. In an effort to increase the processing speed and flexibility of supercomputers, the cluster architecture for highly parallel multiprocessors described in the previously identified parent application provides an architecture for supercomputers wherein a multiple number of processors and external interface means can make multiple and simultaneous requests to a common set of shared hardware resources, such as main memory, secondary memory, global registers, interrupt mechanisms, or other shared resources present in the system.

One of the important problems in designing such shared resource, multiprocessor systems is providing an effective mechanism for quickly interrupting processors in the event of a hardware exception or processor breakpoint. Parallel processing software running on present multiprocessor systems is sometimes very difficult to debug in the event of a failure. Because of the lack of an effective fast interrupt mechanism in present supercomputers, it is difficult to stop all of the processors in the community associated with the parallel process. The result is that one or more of the non-stopped processors may destroy the information necessary to identify the failure because they continue to operate for many hundreds, or even thousands of clock cycles after the failure is detected by the failing processor.

For example, most prior art massively parallel computer processing systems utilize a wavefront technique for interrupting the processors. The processor that encounters the exception or that generates the interrupt is treated as the center of the wave and the interrupt is propagated out from that processor according to the particular interconnection architecture for the system. In this model, the processors on the outermost edge of the system will not be interrupted until the interrupt wave reaches them, a time period that may be quite variable.

Another problem with many of the present interrupt mechanisms for multiprocessor systems is that all of the processors in the multiprocessor system are unconditionally interrupted in the event of a fault, not just the processors associated with a process group. The disadvantage to this technique is that all programs executing on the multiprocessor system are halted, not just the processes associated with the program experiencing the fault.

Two associated problems arise out of the inability to adequately direct signal requests to one or more processors. With many of the present interrupt mechanisms for supercomputers, for example, the Cray-1 and Cray X-MP supercomputers available from Cray Research, Inc., the interrupt mechanisms do not allow an intelligent peripheral to target a service request to a particular processor that could best field the service request. A second problem is that if a peripheral or processor requires the attention of more than one other processor, multiple sequential signals or interrupts must be sent, one for each of the processors being requested.

Although the prior art interrupt mechanisms for multiprocessor systems are acceptable under certain conditions, it would be desirable to provide a more effective interrupt mechanism for a multiprocessor system that was able to interrupt the execution of all processors in a community of associated processors within a bounded number of clock cycles from an interrupt. In addition, it would be desirable to provide an interrupt mechanism for the cluster architecture for the multiprocessor system described in the parent application that aids in providing a fully distributed, multithreaded software environment capable of implementing parallelism by default.

SUMMARY OF THE INVENTION

The present invention is a method and apparatus for simultaneously interrupting a community of associated processors in a multiprocessor system. The present invention enables the more effective debugging of software executing on a multiprocessor system by allowing all of the processors in a community associated with a parallel process to be halted within a limited number of clock cycles following a hardware exception or processor breakpoint.

The present invention consists of a set of registers that are used to identify associations among multiple processors, a comparison matrix that is used to select processors to be interrupted, a network of interconnections that transmit interrupt events to and from the processors, and elements in the processors that create and respond to Fast Interrupt events.

The multiprocessor system of the preferred embodiment includes a number of interrupt-type actions that will be referred to as events. Events include signals, traps, exceptions and interrupts. Because of the differences in each of the events, different software, and in some cases, hardware is required to most efficiently process an event. Unlike prior art multiprocessor systems, the preferred multiprocessor is capable of processing events both in the processors and in the peripheral controllers that are allowed to distributively access the common data structures associated with the multithreaded operating system. Also, unlike prior art multiprocessor systems, the present invention halts only those processors executing processes associated with the process group for a given program, instead of halting all of the processors in the multiprocessor system.

An objective of the present invention is to provide a method and apparatus for a fast interrupt mechanism for a multiprocessor system that can quickly and effectively interrupt all of the processors in a community associated with a parallel process operating on a multiprocessor system.

Another objective of the present invention is to provide a fast interrupt mechanism that can resolve simultaneous conflicting interrupts issued by a plurality of processors.

A further objective of the present invention is to provide a fast interrupt mechanism that halts only those processors executing processes associated with the process group for a given program, instead of halting all of the processors in a multiprocessor system.

These and other objectives of the present invention will become apparent with reference to the drawings, the detailed description of the preferred embodiment and the appended claims.

DESCRIPTION OF THE DRAWINGS

FIGS. 4a and 4b represent the addresses for the SETI and SETN registers in the four cluster implementation of the preferred embodiment of the present invention.

FIG. 6a is a diagram of the System Mode register.

FIG. 6b is a diagram of the Pending Interrupts register.

FIG. 6c is a diagram of the User Mode register.

FIG. 6d is a diagram of the Exception Status register.

FIG. 7 is a block diagram of showing the implementation of the Fast Interrupt mechanism as part of the NRCA means of the preferred embodiment of the multiprocessor system.

DESCRIPTION OF THE PREFERRED EMBODIMENT

Figure 1:
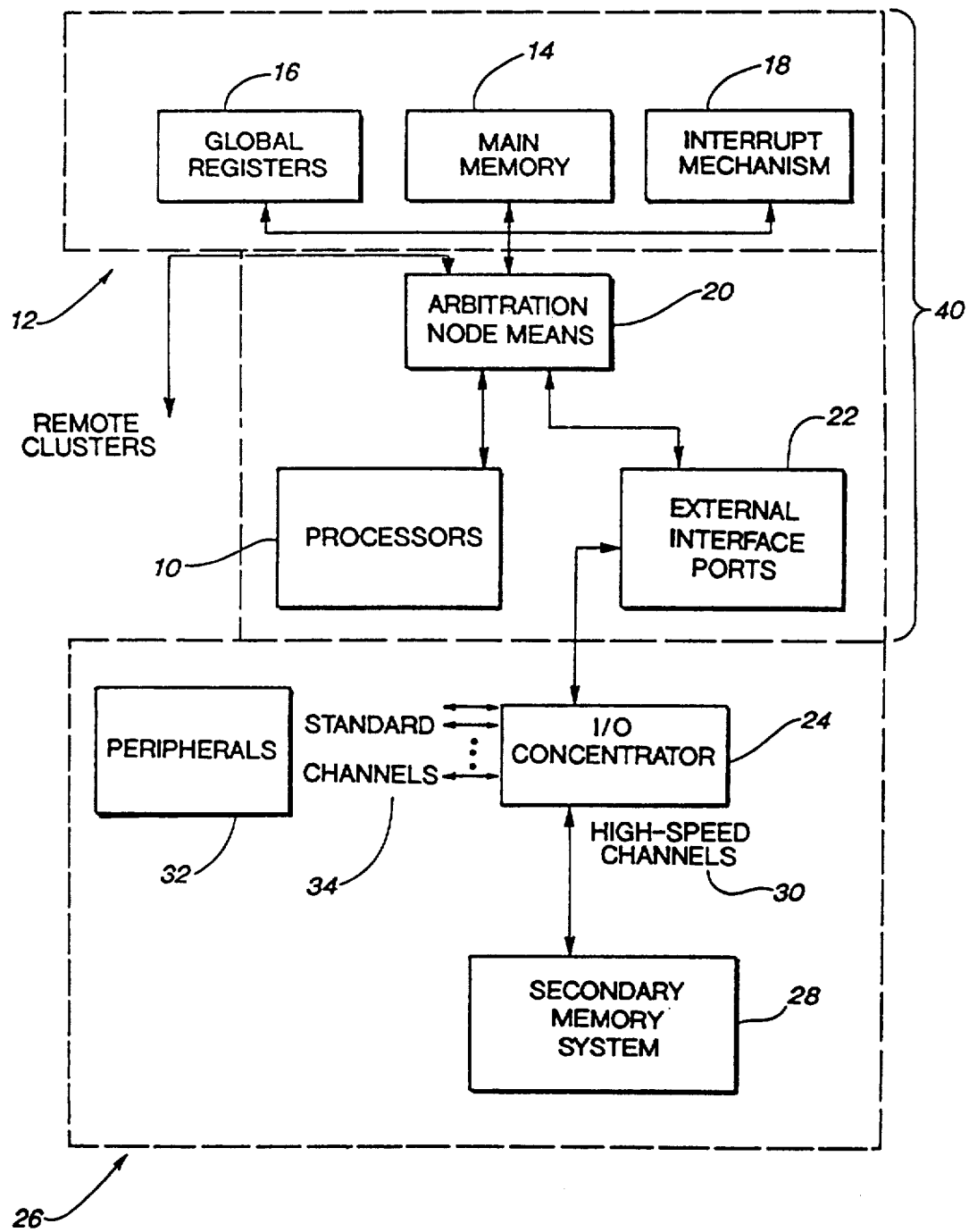
FIG. 1 is a block diagram of a single multiprocessor cluster of the preferred embodiment of the present invention.

Referring to FIG. 1, the architecture of a single multiprocessor cluster of the preferred embodiment of the multiprocessor system for use with the present invention will be described. The preferred cluster architecture for a highly parallel scalar/vector multiprocessor system is capable of supporting a plurality of high-speed processors 10 sharing a large set of shared resources 12 (e.g., main memory 14, global registers 16, and interrupt mechanisms 18). The processors 10 are capable of both vector and scalar parallel processing and are connected to the shared resources 12 through an arbitration node means 20. Also connected through the arbitration node means 20 are a plurality of external interface ports 22 and input/output concentrators (IOC) 24 which are further connected to a variety of external data sources 26. The external data sources 26 may include a secondary memory system (SMS) 28 linked to the input/output concentrator 24 via a high speed channel 30. The external data sources 26 may also include a variety of other peripheral devices and interfaces 32 linked to the input/output concentrator 24 via one or more standard channels 34. The peripheral devices and interfaces 32 may include disk storage systems, tape storage system, printers, external processors, and communication networks. Together, the processors 10, shared resources 12, arbitration node 20 and external interface ports 22 comprise a single multiprocessor cluster 40 for a highly parallel multiprocessor system in accordance with the preferred embodiment of the present invention.

Figure 2A:
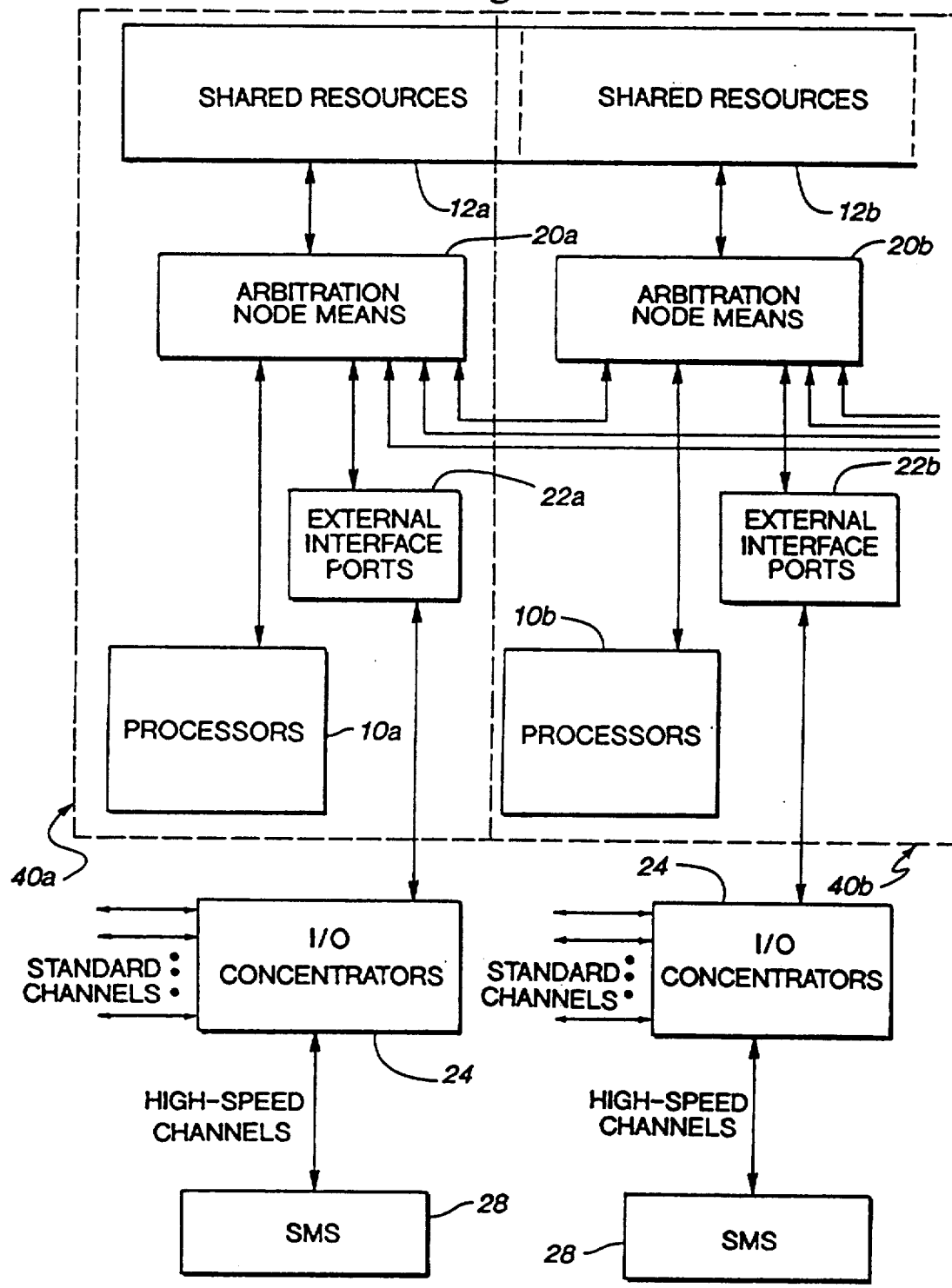
FIG. 2a and 2b is block diagram of a four cluster implementation of the preferred embodiment of the present invention.
Figure 2B:
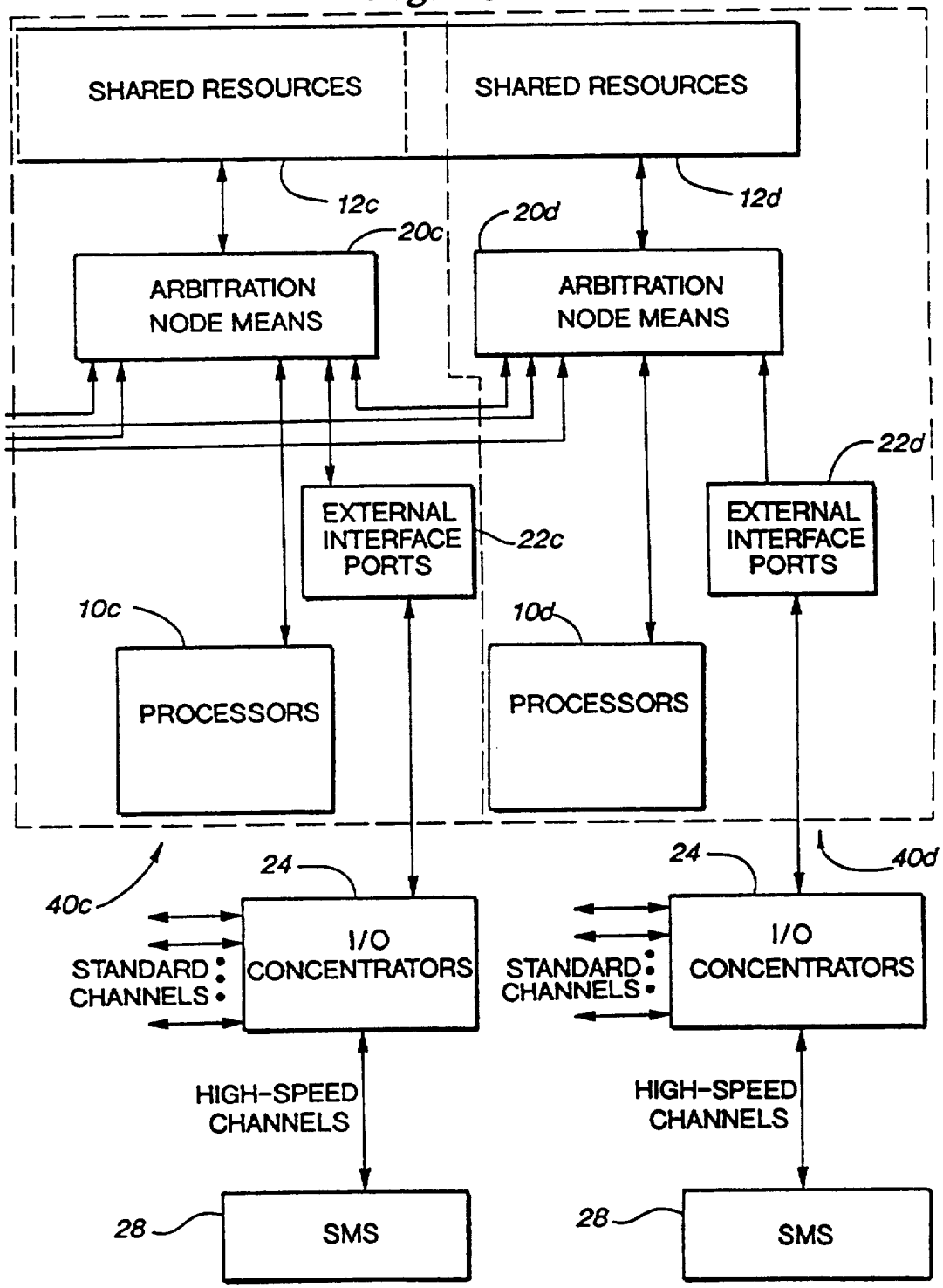

The preferred embodiment of the multiprocessor clusters 40 overcomes the direct-connection interface problems of present shared-memory supercomputers by physically organizing the processors 10, shared resources 12, arbitration node 20 and external interface ports 22 into one or more clusters 40. In the preferred embodiment shown in FIG. 2a and 2b, there are four clusters: 40a, 40b, 40c and 40d. Each of the clusters 40a, 40b, 40c and 40d physically has its own set of processors 10a, 10b, 10c and 10d, shared resources 12a, 12b, 12c and 12d, and external interface ports 22a, 22b, 22c and 22d that are associated with that cluster. The clusters 40a, 40b, 40c and 40d are interconnected through a remote cluster adapter 42 that is a logical part of each arbitration nodes means 20a, 20c, 20c and 20d. Although the clusters 40a, 40b, 40c and 40d are physically separated, the logical organization of the clusters and the physical interconnection through the remote cluster adapter 42 enables the desired symmetrical access to all of the shared resources 12a, 12b, 12c and 12d across all of the clusters 40a, 40b, 40c and 40d.

Figure 3:
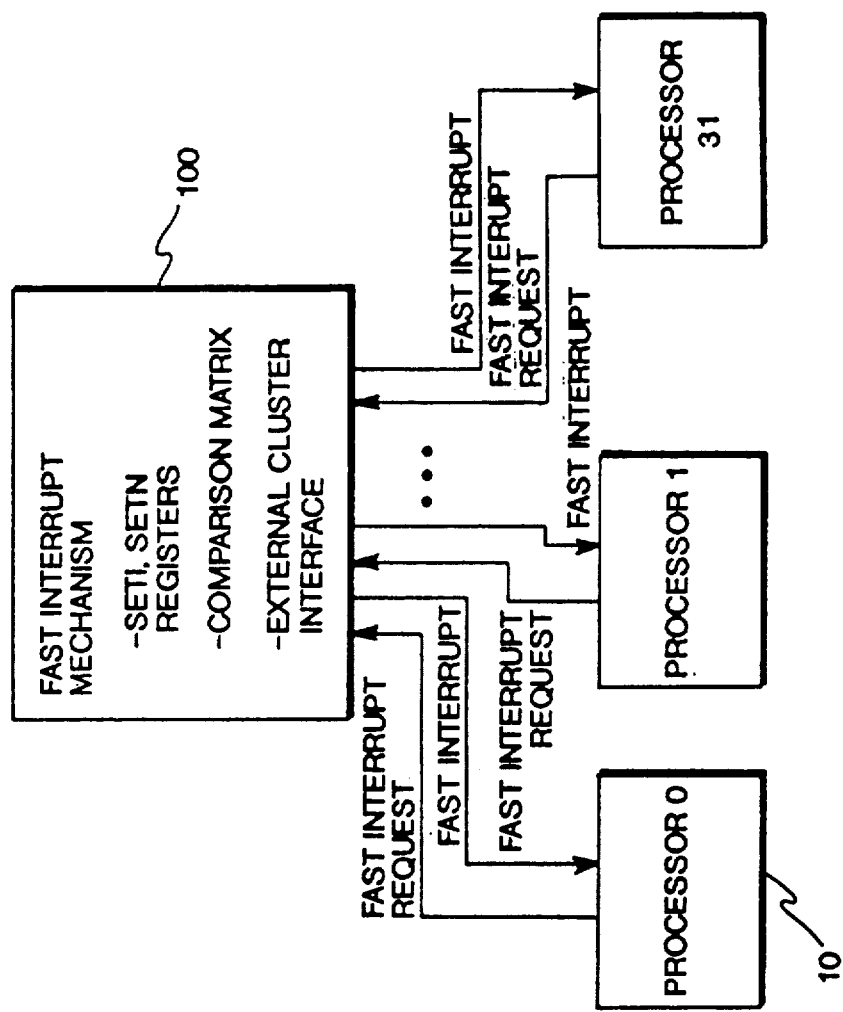
FIG. 3 is a block diagram of the interconnections for the Fast Interrupt Mechanism of the present invention.

Referring to FIG. 3, the Fast Interrupt mechanism 100 will be described. The Fast Interrupt mechanism 100 allows a processor 10 to simultaneously send an interrupt to all other processors 10 associated with the same process. The Fast Interrupt mechanism 100 can simultaneously process all of the interrupt signals received at the interrupt mechanism 18 in a single cycle. However, signal delays may cause both the issuance and receipt of Fast Interrupts to be delayed for a plurality of cycles before or after the interrupt logic. Processors 10 are mapped into logical sets for purpose of operating system control by the contents of a group of Set Number (SETN) registers that are part of each cluster 40. In the preferred embodiment, there are 32 SETN registers in the global register system for a single cluster 40, one for each processor 10 in the multiprocessor system. A processor 10 is assigned to a set (process group) by loading that processor's SETN register with the value identified with the desired set. The 7-bit set value permits identification of 128 unique sets, one for each processor in a full system. Both processors and peripheral controllers can both read and write the SETN registers.

Another register, called the SET Interrupt (SET) register, can be used to generate a Fast Interrupt to an explicit set of processors. Writing a value to SETI causes a Fast Interrupt to be sent to all processors whose SETN contents match the written value. The 7-bit value written to SETI is compared to the contents of all of the SETN registers when SETI is written. Interrupts are sent to all processors whose SETN register contents match the value in SETI. Both processors and peripheral controllers can write SETI, but SETI cannot be read.

SETN and SETI registers are part of the set of global registers 16 and are accessed in the same manner. From a processor, the SETN registers are read and written and the SETI registers written via the Group 1 MOVE instruction. Attempting the other Group 1 instructions on the SETN registers causes no change to the registers, and any data returned will contain unpredictable results. The SETN and SETI registers occupy bits 6 through 0 of the highest global register addresses in a cluster. They are addressed by setting a binary one in bit 15 of the GOFFSET register. FIG. 4a shows the SETN and SETI address map. Input/output devices have a memory map that is different than the map used by the processors. The SETN addresses as seen from an peripheral controller for an input/output device are shown in the FIG. 4b.

Figure 5:
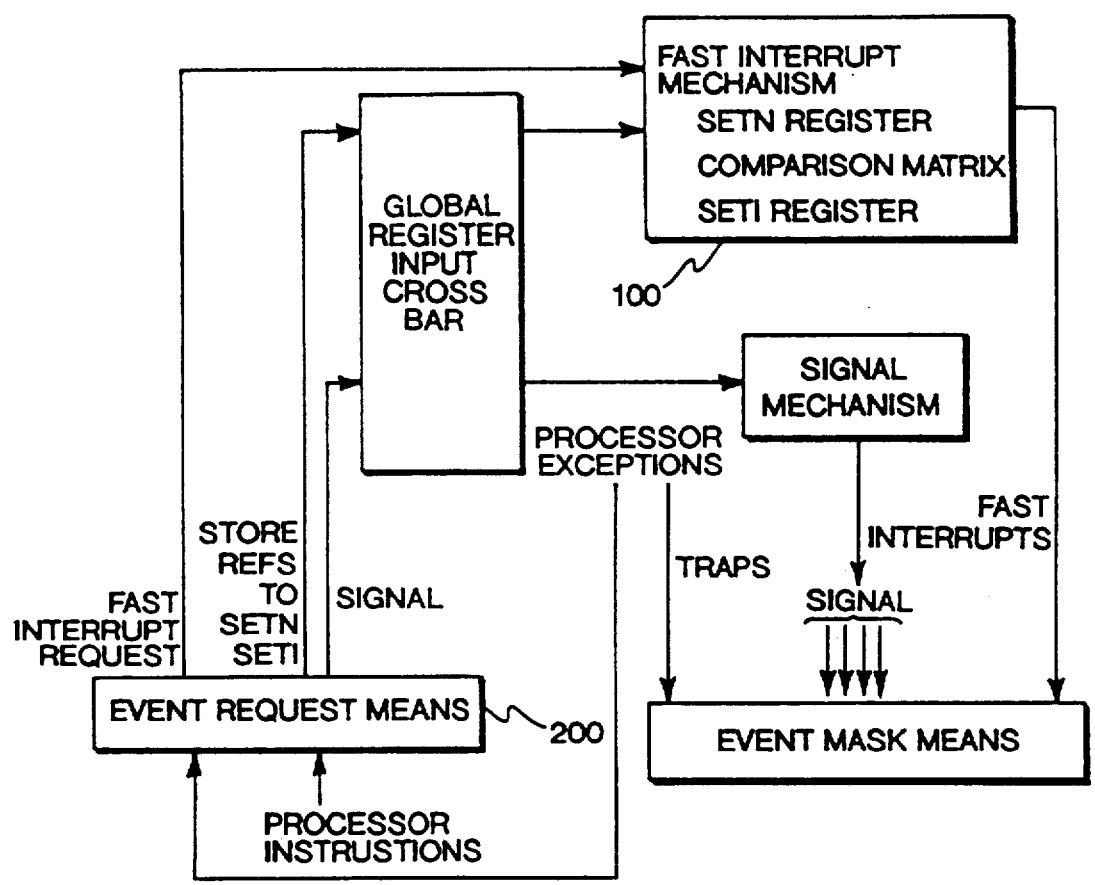
FIG. 5 is a block diagram showing the flow of fast interrupt events in a cluster in the preferred embodiment.

Referring now to FIG. 5, the method for generating and receiving Fast Interrupt events in the processors will be described. The event request means 200 creates Fast Interrupt events in two basic ways. The first method is through assertion of the Fast Interrupt Request Line. The Fast Interrupt Request Line can be asserted by: (1) an exception condition (captured in the Exception Status register); or (2) issuing a Fast Associate Interrupt Request (FAIR) instruction to request an interrupt in the set of associated processors. The second method for creating Fast Interrupt Events is through writing a set number to the SETI register.

The various processor control registers that are used by the processor in handling events are shown and described in FIGS. 6a, 6b, 6c and 6d. The Pending Interrupt register (PI) contains an indicator that shows that a Fast Interrupt has been received (FI, bit 11). A System Mode register bit, Disable Fast Interrupt (DFI, bit 11), disables incoming Fast Interrupt requests. A processor cannot be interrupted by a Fast Interrupt request while DFI is set to one.

The algorithm for generating a Fast Interrupt request by processor exception is (ENBx and EXCEPTIONx) and (not DEX) and (not FIRM) where;
 ENBx is one of exception enables in the User Mode UM register
 EXCEPTIONx is the associated exception condition as shown in the Exception Status ES register
 DEX is the disable exception bit in the System Mode SM register (bit 6)
 FIRM is the Fast Interrupt Request Mask located in the System Mode SM register (bit 4)

FIRM disables generation of a Fast Interrupt request when any exception is encountered. Setting FIRM to one disables Fast Interrupt request. If an individual exception is disabled, the Fast Interrupt can't occur for that type of exception. Note that setting Disable Exception (DEX) to one disables Fast Interrupt requests regardless of the state of FIRM.

A processor 10 can also generate a Fast Interrupt request through the FAIR instruction. Issuing a FAIR instruction will cause all processors 10 whose SETN registers contain the same value as the SETN of the issuing processor to receive a Fast Interrupt. It should be noted that the processor 10 that executed the FAIR instruction will NOT receive a Fast Interrupt itself. In addition, Fast Interrupt requests made by the FAIR instruction are masked by FIRM (System Mode SM register, bit 4). Setting FIRM to one disables Fast Interrupt request.

Although both peripheral devices 32 and the SMS 28 may initiate Fast Interrupts, only processors 10 can be interrupted by Fast Interrupt Operations. The input-/output subsystem allows a peripheral device 32 to directly write the number of the set to be interrupted to the Fast Interrupt logic. As previously described, this occurs by writing into the SETI register. All processors 10 whose SETN registers contain the value written are then interrupted. Writing to SETI is the only mechanism that allows Fast Interrupts to be initiated from peripheral devices 32.

In operation, the operating system software (including a user-side scheduler in the preferred embodiment) assigns the processors 10 to a process group by writing the process number in the SETN register for that processor 10. Two steps are necessary to include a processor 10 in a set (process group). First, the SETN register for that processor 10 must be written with the number of the set it will be associated with. Second, the DFI bit in that processor's System Mode register must be set to zero. Peripheral devices 32 cannot receive Fast Interrupts. For a more detailed description of how the operating system assigns processors 10 to process groups, reference is made to the appendices in the previously identified copending application entitled DISTRIBUTED INPUT/OUTPUT ARCHITECTURE FOR A MULTIPROCESSOR SYSTEM.

Referring now to FIG. 7, the physical organization of the Fast Interrupt Mechanism in the four-cluster preferred embodiment of the present invention will be described. The preferred embodiment provides addressing for up 128 SETN registers located among the four clusters 40. There are 32 SETN registers per cluster 40. In this embodiment, the SETN registers 16 for each cluster 40 are physically located within the NRCA means 46 of that cluster. For the purposes of addressing, the SETI register is treated as one of the SETN registers and is accessed in the same manner, except that the SETI register cannot be read.

There are sixteen ports 47 to the global registers 16, signal logic 31, and fast interrupt logic 33 from the thirty-two processors 10 and thirty-two external interface ports 22 in a cluster 40. Each port 47 is shared by two processors 10 and two external interface ports 22 and is accessed over the path 52. A similar port 49 services inter-cluster requests for the global registers 16, fast interrupt logic 31, and signal logic 33 in this cluster as received by the MRCA means 48 and accessed over the path 56. As each request is received at the NRCA means 46, a cross bar and arbitration means 51 directs requests to the appropriate destination. If simultaneous requests come in for access to the SETN registers in the fast interrupt logic 33, for example, these requests are arbitrated for in a pipelined manner by the cross bar and arbitration means 51. The cross bar and arbitration means 51 utilizes a Multiple Request Toggling scheme algorithm. It receives input from sixteen arbitration nodes 44 and one MRCA means 48. An arbitration decision requires address information to select the target register and control information to determine the operation to be performed. This information is transmitted to the NRCA means 46 along with the data. The address and control can be for data to be sent to global registers 16 or to signal logic 31 or the fast interrupt logic 33. For a complete description of the operation of the cross bar and arbitration logic 51, reference is made to the appendices in the previously identified co-pending application entitled DISTRIBUTED INPUT-/OUTPUT ARCHITECTURE FOR A MULTI-PROCESSOR SYSTEM.

Figure 8:
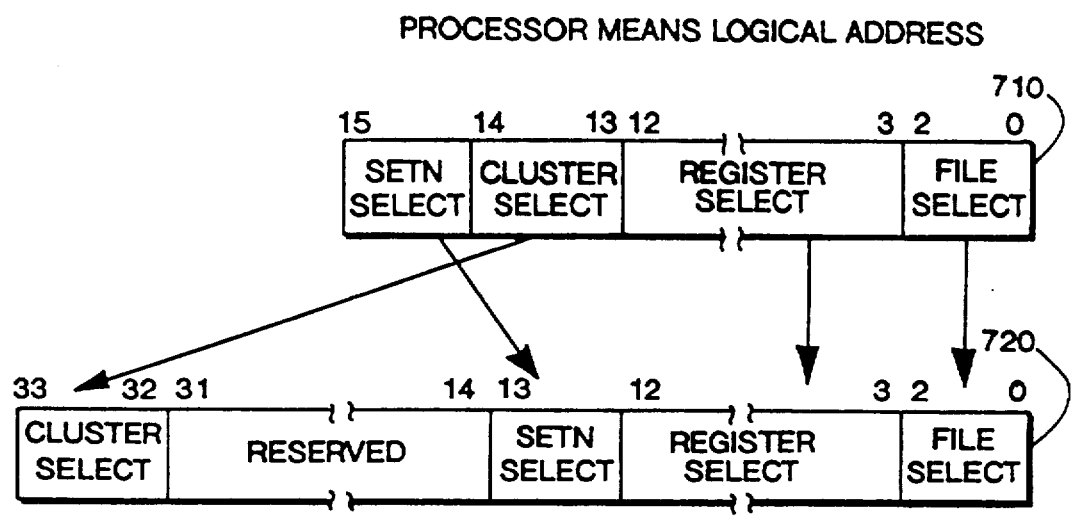
FIG. 8 is a schematic representation of the logical and physical address maps for the global registers.

Referring now to FIG. 8, the method for addressing the global registers 16 is illustrated. Two methods are shown. The logical address map 710 is used by the processor 10. The physical address map 720 is used by the IOC 24. The methods for accessing the global registers 16 are also used to address the SETN and SETI registers in the preferred embodiment. For a complete description of the addressing of the global register 17, reference is made to the appendices in the previously identified co-pending application entitled DISTRIBUTED INPUT/OUTPUT ARCHITECTURE FOR A MULTI-PROCESSOR SYSTEM.

Figure 9:
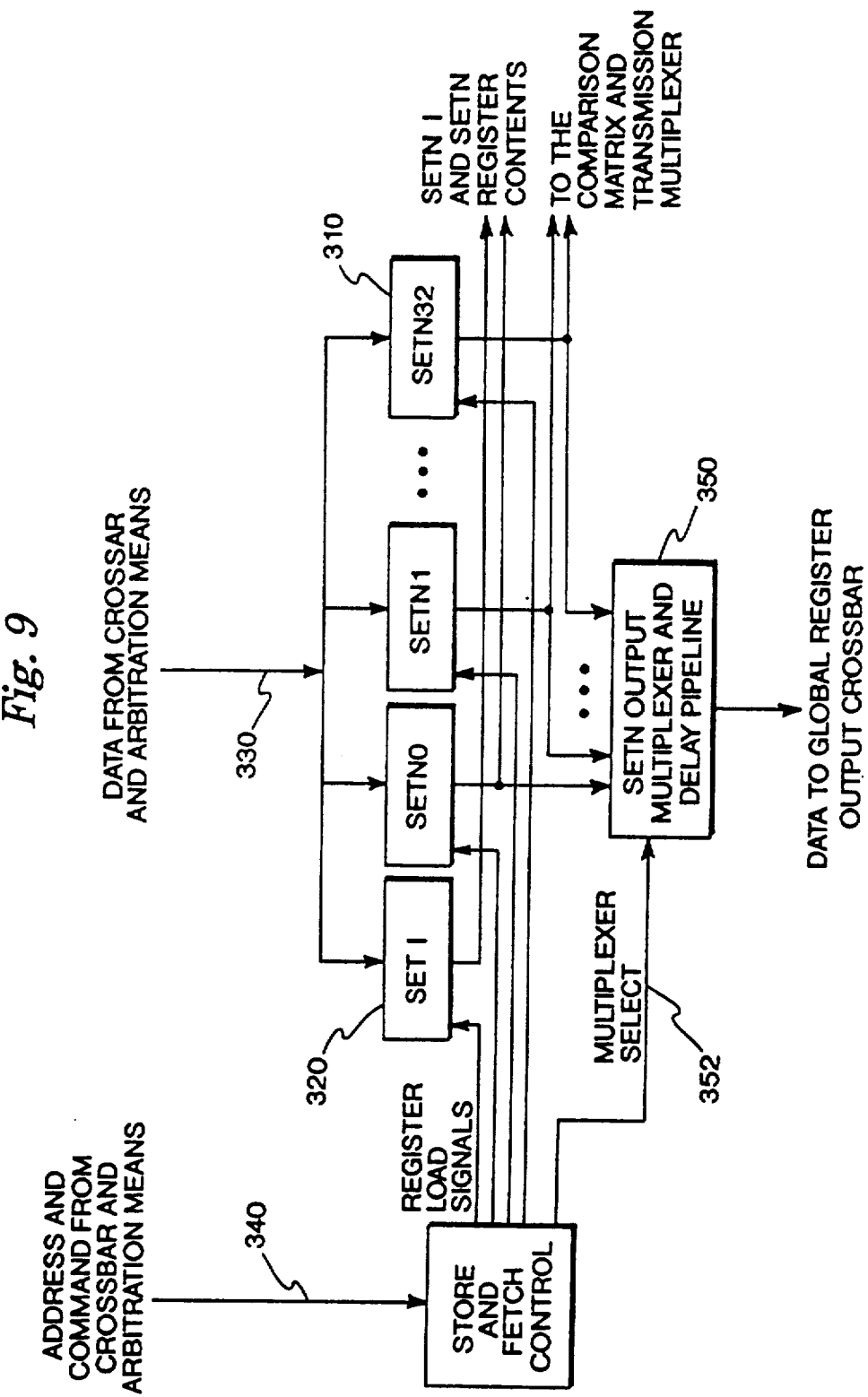
FIG. 9 is a block diagram of the Fast Interrupt mechanism SESTN and SETI register data paths.

Referring to FIG. 9 the preferred implementation of the Fast Interrupt mechanism 100 will be described. FIG. 9 shows the data path to the SETN registers 310 and the SETI register 320. Data to be written into any of the registers 310 or 320 is sent via the input bus 330. The input bus 330 is driven from the output of the cross bar and arbitration means 51. Information on the address and command lines 340 that accompany the data is decoded and used to select the register 310 or 320 to be written. Only one register 310 or 320 can be written in a single clock cycle. Data to be read is returned to the requesting device through the output mux and delay pipeline 350. The address information that accompanied the read command is decoded to create the multiplexer select controls 352. In the preferred embodiment, the delay pipeline 350 is used to delay the read data so that the read latency for the SETN registers matches that of the global registers 16. The delay must be the same for all registers that are read through the NRCA means 46 since the cross bar and arbitration means 51 return data to the output paths 52 and 54.

FIG. 3 shows the interconnection of fast interrupt lines between the processors and the Fast Interrupt Mechanism. Fast Interrupt events are transmitted to the FAST Interrupt Mechanism through the event request lines. Fast Interrupts are transmitted to the processors over the Fast Interrupt lines. There is a separate pair of event/interrupt lines for each processor 10. This implementation eliminates any contention among processors 10 to send requests as well as any queuing to return Fast Interrupts to the processors 10 that would be incurred if shared, multiplexed transmission methods were used. The latency between request and resulting Fast Interrupt is kept to a minimum as a result.

Figure 10:
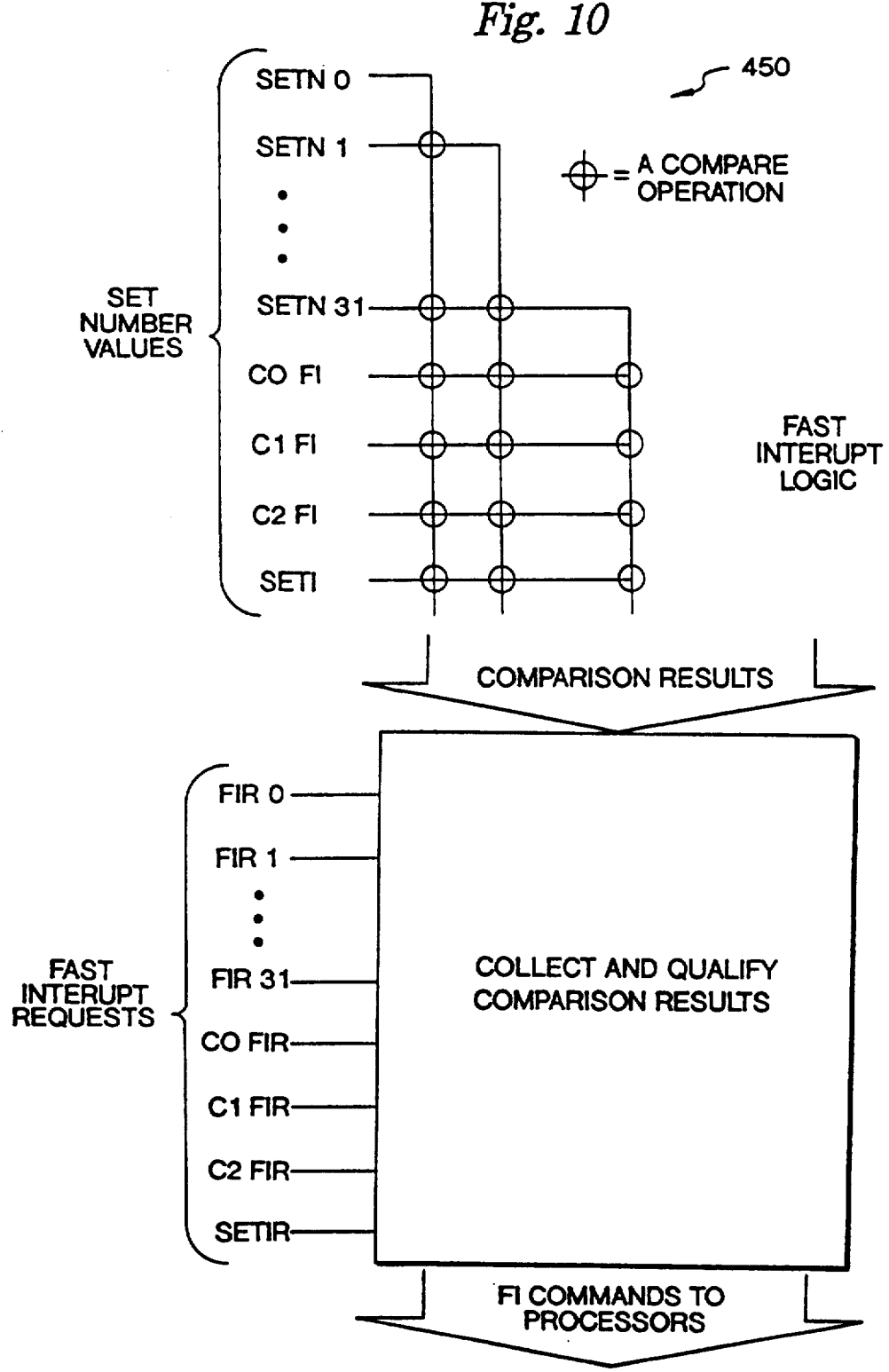
FIG. 10 is a schematic diagram of the Fast Interrupt dispatch logic.

When one processor 10 in a set (process group indicated by the SETN register) generates a Fast Interrupt request, the interrupt dispatch logic 450 sends interrupts to all of the processors 10 in the same set as the one that initiated the request by performing a 36-way simultaneous comparison of all SETN values as shown in FIG. 10. The notations SETN0, SETN1, SETN2 and so on in FIG. 10 represent the values contained in SETN registers 0, 1, 2 etc. The notation C0FI, C1FI, and C2FI represent Fast Interrupt values sent from another cluster. The value sent identifies the processor set that is to be interrupted. The method for creating and transmitting this value is described in more detail hereinafter. The notation SETI represents the contents of the SETI register. Comparisons among all values are continuously made. When a Fast Interrupt event is received from a processor 10 or external interface port 22 the occurrence of the event is used in the qualification logic to initiate the actual interrupt. The combination of a comparison and the event signal from the initiating processor 10 or external interface port 22 will cause the processor 10 associated with the comparison to be interrupted.

Figure 11:
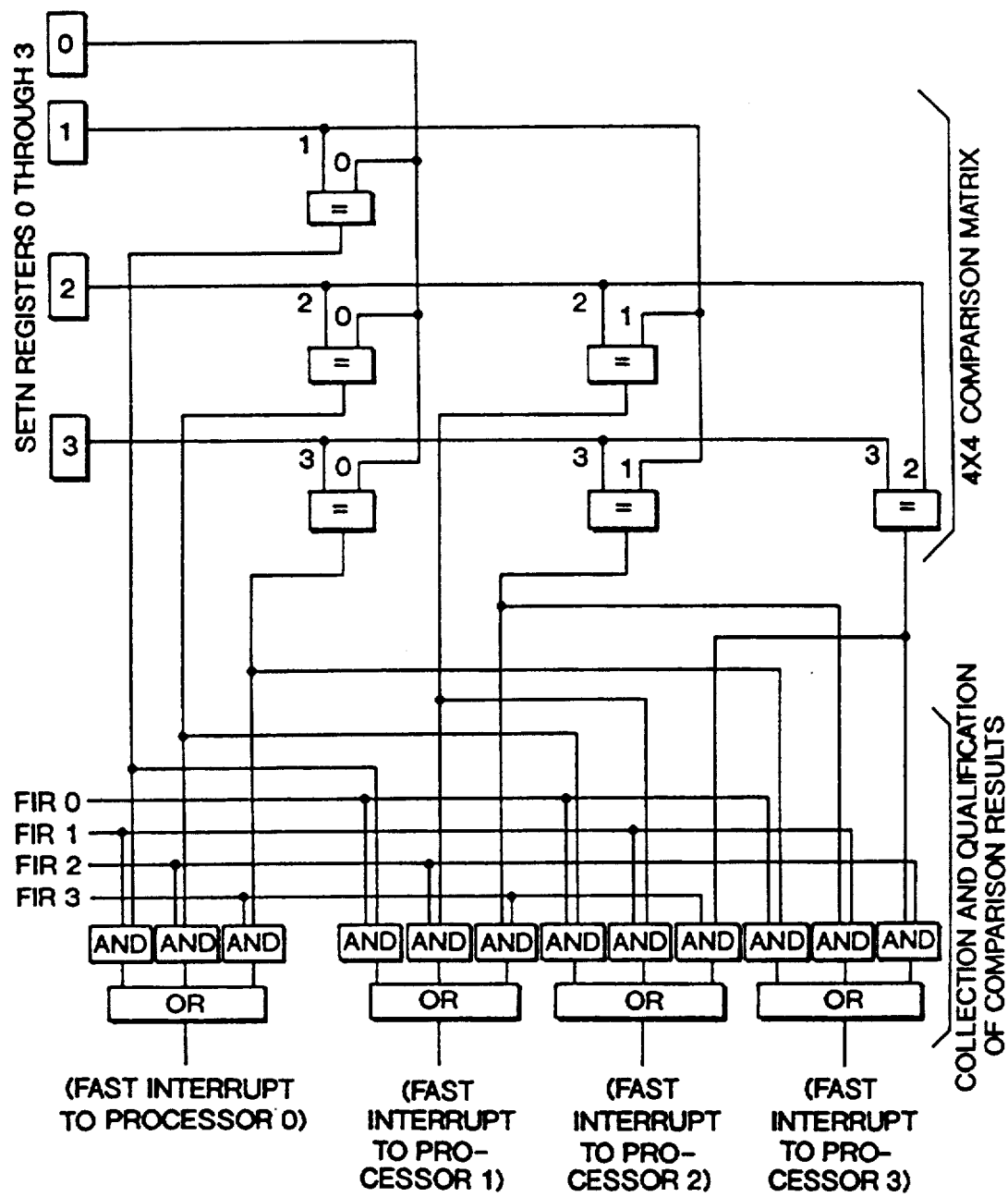
FIG. 11 is a detailed implementation of one embodiment of the Fast Interrupt dispatch logic shown in FIG. 10.

A detailed circuit diagram of the preferred implementation of the interrupt logic for the simultaneous comparison and verification circuit for an example four interrupt system is shown in FIG. 11. Four SETN registers are shown. The output of the SETN registers are connected to a matrix of comparators in the illustrated manner such that all registers are simultaneously compared with each other. The results of the comparisons are logically ANDed with the Fast Interrupt Event signals received from the processors, shown in the figure as FIR0, FIR1, FIR2, and FIR3 to produce the fast interrupt signals that are sent to each processor. Each comparison is used in the logical terms that produce interrupts for each processor associated with the two SETN registers that are being compared. For example, the output of the comparison between SETN0 and SETN1 is used in the terms that produce fast interrupts for processors 0 and 1. In the case of the term to produce the fast interrupt for processor 0, the comparison result is anded with the fast interrupt event from processor 1 to produce the fast interrupt for processor 0. Similarly, in the term for processor 1, the event from processor 0 is used. Since processors do not send Fast interrupts to themselves through the comparison process, the event from any processor is not used in its own fast interrupt term. This method is repeated for all comparisons so that all possible combinations of associations can be properly handled by the qualification logic. All outputs from the AND operations for any processor are logically ORed together to form the actual processor Fast Interrupt. The example can easily be extended to see how the comparisons among the 32 SETN registers in a single cluster 40 are performed and the fast interrupts generated.

Figure 12:
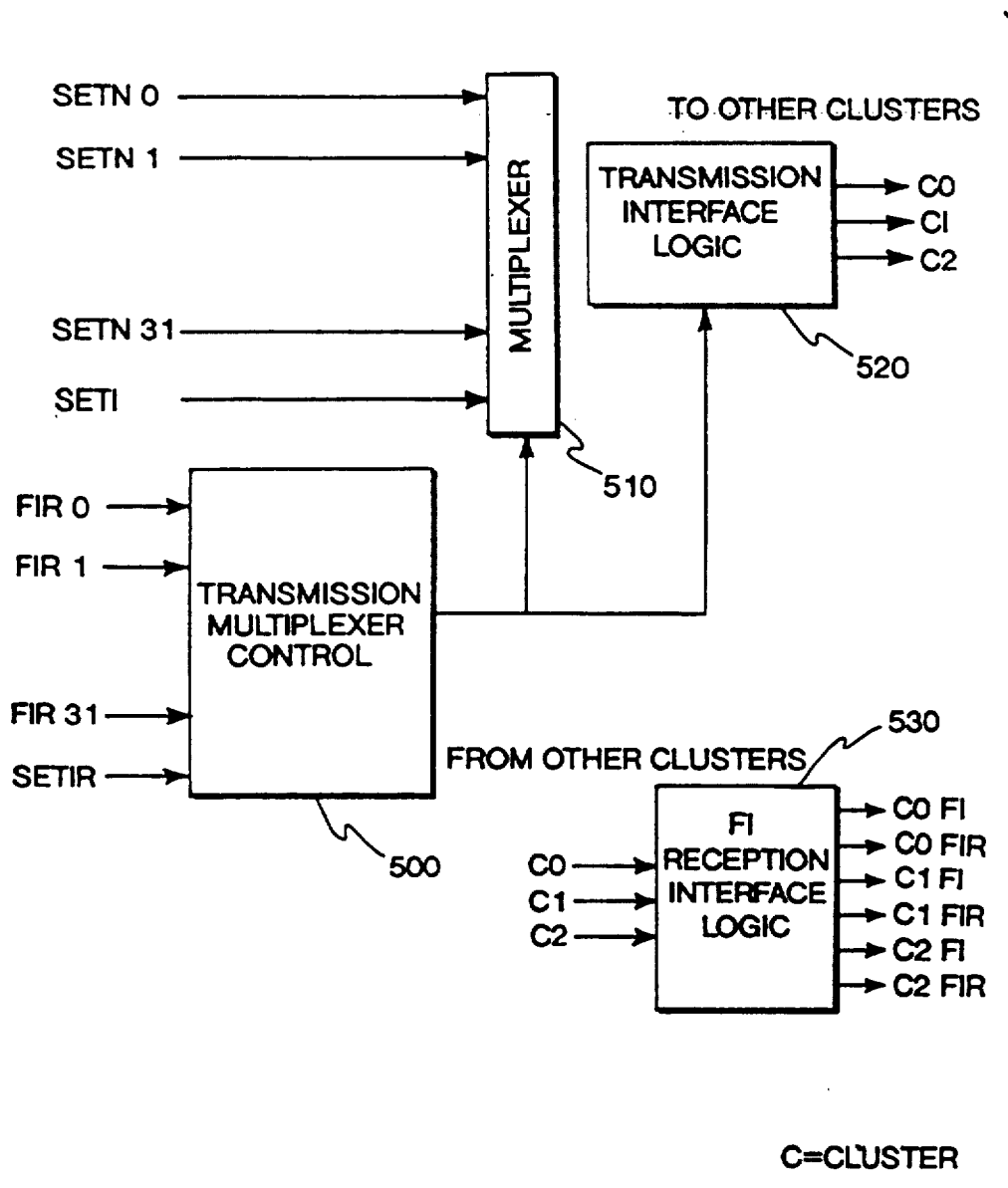
FIG. 12 is a block diagram of the inter-cluster Fast Interrupt interface for the four cluster implementation of the preferred embodiment.

Because the SETN registers in other clusters are not available for comparison, the contents of the SETN register associated with a processor that has created a Fast Interrupt event is sent to all other clusters when the event is received at the Fast Interrupt mechanism. The means for doing this is shown in FIG. 12. Each of the Fast Interrupt events within the cluster (FIR 0-31) and the event of writing a value to the SETI register, shown as SETIR in the figure, is sent to the Transmission Multiplexer control logic 500. The assertion of any of these signals causes the transmission Mux control logic 500 to select the contents of the SETN register associated with the processor that created the fast interrupt event (or the SETI register contents) to be sent through the transmission multiplexer 510 and on to the transmission interface logic 520. The transmission interface logic 520 sends the selected value to all other clusters, along with a signal indicating that this cluster has had a fast interrupt event. Set number values from other clusters are received at the Fast interrupt reception interface logic 530. This logic 530 receives the values sent from other clusters along with the valid signals and sends them to the comparison matrix. The set number value sent from clusters 1, 2, and 3 are referred to in the diagrams as C0FI, C1FI, and C2FI, respectively. The valid event signals from clusters 1, 2, and 3 are referred to as COFIR, C1FIR, and C2FIR, respectively.

It should be noted that if multiple fast interrupt events occur simultaneously in a cluster 40, the set number values associated with each event must be sent between clusters serially. The Transmission multiplexer control logic 500 detects this condition and holds all events that have occurred until the associated set number value has been transmitted. The order in which simultaneous events are resolved is determined by a simple priority scheme in which SETN0 is lowest priority, ascending through in numerical order to SETN32 which is second highest, with SETI events the highest priority.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A fast interrupt mechanism for a multiprocessor system comprising:
   a plurality of processors in the multiprocessor system wherein each processor is assigned a process number and a common process number defines a selected set of processors representing all of the processors which are working in parallel on a single process; and
   a fast interrupt means uniquely connected to each processor for receiving interrupts and exceptions from one or more of the processors and for simultaneously interrupting all of the processors associated with the selected set of processors working in parallel on a single process within a bounded number of clock cycles in response to receiving the interrupt or exception, the fast interrupt means including:
   a plurality of register means, one for each of the processors in the multiprocessor system, for storing the process number assigned to that processor;
   a plurality of event means, one for each of the processors in the multiprocessor system, for indicating that an event request representing an exception or an interrupt was generated by that processor; and
   comparison means operably connected to the register means and the event means for comparing the process number in the register means for a processor having a valid interrupt or exception as indicated in the event means with the process number in each of the register means and for generating an interrupt to be sent to each processor that matches the comparison, such that all processors working on the same process in parallel have the same process number and are interrupted in parallel.

2. The fast interrupt mechanism of claim 1 wherein the fast interrupt means comprises:
   a plurality of SETN register means, one for each of the processors in the multiprocessor system, for storing the process number assigned to that processor;
   a plurality of FIR event means, one for each of the processors in the multiprocessor system, for indicating that an event request signal has been received by the fast interrupt means from that processor, the event request signal being generated in response to an exception or to an interrupt generated by a fast interrupt instruction executed by that processor; and
   comparison matrix means operably connected to the SETN register means and the FIR event means for simultaneously comparing the process number in the SETN register means for a processor having a valid interrupt or exception as indicated in the FIR event means with the process number in each of the SETN register means and for generating an interrupt to be sent to each processor that matches the comparison,
   such that receiving an event request signal will interrupt all of the processors having the same process number as the processor generating the event request signal.

3. The fast interrupt mechanism of claim 1 wherein the fast interrupt means comprises:
   a plurality of SETN register means, one for each of the processors in the multiprocessor system, for storing the process number assigned to that processor;
   a SETI register means for temporarily storing the process number of the selected set of processors to be interrupted; and
   comparison matrix means operably connected to the SETN register means and the SETI register means for simultaneously comparing the value in the SETI register means with the process number in each of the SETN register means and for generating an interrupt to be sent to each processor that matches the comparison,
   such that when the SETI register means is written with a process number, all of the processors of the selected set of processors having the same process number as the process number written into the SETI register means will be interrupted.

4. The fast interrupt mechanism of claim 3 further comprising a plurality of peripheral devices operably connected to the multiprocessor system, the peripheral devices adapted for sending interrupts to the fast interrupt means by writing a process number into the SETI register means corresponding to the selected set of processors to be interrupted.

5. The fast interrupt mechanism of claim 1 wherein each processor includes:
   user mode register mask means for allowing a user to enable whether exceptions will be reported to the fast interrupt means when the exceptions are encountered by hardware circuitry in the processor;
   exception status register means for reporting the status of exceptions that have been encountered by the hardware circuitry;

pending interrupt register means for reporting whether an interrupt has been received from the fast interrupt means; and system mode register mask means for allowing operating system commands to enable whether an interrupt or exception will be reported to the fast interrupt means and to disable whether an interrupt will be acted upon by the processor when received from the fast interrupt means.

6. A fast interrupt mechanism for a multiprocessor system having a plurality of computer processors wherein each computer processor is assigned a process number and a common process number defines a selected set of computer processors representing all of the computer processors which are working in parallel on a single process and communication means for coupling the computer processors together, the fast interrupt mechanism comprising:

interrupt interconnection means for each computer processor separate from the communication means for coupling the computer processors together for sending event requests from that computer processor and for receiving interrupts for that computer processor; and fast interrupt means operably connected to all of the interrupt interconnection means for receiving event requests from one or more computer processors and for simultaneously sending interrupts to all of the computer processors associated with a selected set of computer processors representing all of the processors which are working in parallel on a single process in response to receiving an event request associated with the selected set of computer processors, the fast interrupt means including:

a plurality of register means, one for each of the computer processors in the multiprocessor system, for storing the process number assigned to that computer processor;

a plurality of even means, one for each of the computer processors in the multiprocessor system, for indicating that an event request representing an exception or an interrupt was generated by that computer processor; and comparison means operably connected to the register means and the event means for comparing the process number in the register means for a computer processor having a valid interrupt or exception as indicated in the event means with the process number in each of the register means and for generating an interrupt to be sent to each computer processor that matches the comparison, such that all processors working on the same process in parallel have the same process number and are interrupted in parallel.

7. The fast interrupt mechanism of claim 6 wherein the event requests comprise interrupts generated by one or more instructions executing in the computer processor and exceptions generated by hardware circuitry associated with the computer processor.

8. The fast interrupt mechanism of claim 6 wherein the interrupts are received by all of the computer processors associated with the selected set of computer processors within a bounded number of clock cycles from the time that the event request is generated by the computer processor encountering the interrupt or exception.

9. The fast interrupt mechanism of claim 6 wherein the interrupt interconnection means for each computer processor comprises:

means associated with the communication means for coupling the computer processors together for transmitting event request information related to the selected set of computer processors to the fast interrupt means;

means separate from the communication means for coupling the computer processors together for transmitting a signal indicating that an event request has occurred for that computer processor; and means separate from the communication means for coupling the computer processors together for receiving interrupts to the computer processor.

10. The fast interrupt mechanism of claim 6 wherein the fast interrupt means comprises:

a plurality of SETN register means, one for each of the processors in the multiprocessor system, for storing the process number assigned to that processor;

a plurality of FIR event means, one for each of the processors in the multiprocessor system, for indicating that an event request signal has been received by the fast interrupt means from that processor, the event request signal being generated in response to an exception or to an interrupt generated by a fast interrupt instruction executed by that processor; and comparison matrix means operably connected to the SETN register means and the FIR event means for simultaneously comparing the process number in the SETN register means for a processor having a valid interrupt or exception as indicated in the FIR event means with the process number in each of the SETN register means and for generating an interrupt to be sent to each processor that matches the comparison, such that receiving an event request signal will interrupt all of the processors having the same process number as the processor generating the event request signal.

11. The fast interrupt mechanism of claim 6 wherein the fast interrupt means comprises:

a plurality of SETN register means, one for each of the processors in the multiprocessor system, for storing the process number assigned to that processor;

a SETI register means for temporarily storing the process number of the selected set of processors to be interrupted; and comparison matrix means operably connected to the SETN register means and the SETI register means for simultaneously comparing the value in the SETI register means with the process number in each of the SETN register means and for generating an interrupt to be sent to each processor that matches the comparison, such that when the SETI register means is written with a process number, all of the processors of the selected set of processors having the same process number as the process number written into the SETI register means will be interrupted.

12. The fast interrupt mechanism of claim 11 further comprising a plurality of peripheral devices operably connected to the multiprocessor system, the peripheral devices adapted for sending interrupts to the fast interrupt means by writing a process number into the SETI register means corresponding to the selected set of processors to be interrupted.

13. A fast interrupt mechanism for a multiprocessor system, the multiprocessor system including a plurality of multiprocessor clusters operably connected to one another, each multiprocessor cluster having shared resource means for storing and retrieving data and control information, a plurality of processor means for performing computer processing of data and control information wherein each processor means is assigned a process number and a common process number defines a selected set of processor means representing all of the processor means which are working in parallel on a single process, a plurality of external interface means for transferring data and control information between the shared resource means and one or more external data sources, and arbitration node means operably connected to the processor means and the external interface means and the shared resource means for uniquely interconnecting the processor means and the external interface means with the shared resource means and with the other processor means and external interface means in that multiprocessor cluster, and for uniquely interconnecting the processor means and external interface means in that multiprocessor with the shared resource means, the processor means and the external interface means of all other of the multiprocessor clusters, the fast interrupt mechanism comprising:

interrupt interconnection means for each processor means separate from the arbitration node means for sending event requests from that processor means and for receiving interrupts for that processor means; and fast interrupt means for each multiprocessor cluster operably connected to the arbitration node means and all of the interrupt interconnection means in that multiprocessor cluster and to the fast interrupt means in all other multiprocessor clusters for receiving event requests from within the multiprocessor cluster and from outside the multiprocessor cluster and for simultaneously sending interrupts to all of the processors means in the selected set of processor means representing all of the processors which are working in parallel on a single process that are within the multiprocessor cluster in response to receiving an event request associated with the selected set of processor means, the fast interrupt means including:

a plurality of register means, one for each of the processor means in the multiprocessor cluster, for storing the process number assigned to that processor means;

a plurality of event means, one for each of the processor means in the multiprocessor cluster, for indicating that an event request representing an exception or an interrupt was generated by that processor means; and comparison means operably connected to the register means and the event means for comparing the process number in the register means for a processor means having a valid interrupt or exception as indicated in the event means with the process number in each of the register means and for generating an interrupt to be sent to each processor means that matches the comparison, such that all processors working on the same process in parallel have the same process number and are interrupted in parallel.

14. The fast interrupt mechanism of claim 13 wherein the event requests comprise interrupts generated by one or more instructions executing in the processor means, interrupts generated by executing one or more instructions in the external interface means and exceptions generated by hardware circuitry associated with the computer processor.

15. The fast interrupt mechanism of claim 14 wherein the interrupts are received by all of the processor means associated with the selected set of processor means within a bounded number of clock cycles from the time that the event request is generated by the processor means or external interface means encountering the interrupt or exception.

16. The fast interrupt mechanism of claim 13 wherein the fast interrupt means for each multiprocessor cluster comprises:

a plurality of SETN register means, one for each of the processor means in the multiprocessor cluster, for storing the process number assigned to that processor means;

a plurality of FIR event means, one for each of the processor in the multiprocessor system, for indicating that an event request signal has been received by the fast interrupt means from that processor, the event request signal being generated in response to an exception or to an interrupt generated by a fast interrupt instruction executed by that processor;

one or more inter-cluster FIR means, one for each of the other multiprocessor cluster, for indicating that a valid event request signal has been received by the fast interrupt means in that multiprocessor cluster and for storing the value of the process number assigned to the processor means in that cluster associated with the valid event request signal; and comparsion means operably connected to the SETN register means, the FIR event means, the inter-cluster FIR means for simultaneously comparing the process number for any processor means having a valid event request in the FIR event means or inter-cluster FIR means with the process number in each of the SETN register means and for generating an interrupt to be sent to each processor that matches the comparison, such that receiving an event request signal will interrupt all of the processors having the same process number as the processor generating the event request signal.

17. The fast interrupt mechanism of claim 16 wherein the fast interrupt means further comprises a SETI register means operably connected to the comparison matrix means for temporarily storing the process number of the selected set of processors to be interrupted, and wherein the comparison matrix means further compares the value in the SETI register means with the process number in each of the SETN register means and generates an interrupt to be sent to each processor that matches the comparison, such that when the SETI register means is written with a process number, all of the processors of the selected set of processors having the same process number as the process number written into the SETI register means will be interrupted.

18. The fast interrupt mechanism of claim 17 further comprising a plurality of peripheral devices operably connected to the multiprocessor system, the peripheral devices adapted for sending interrupts to the fast interrupt means by writing a process number into the SETI register means corresponding to the selected set of processors to be interrupted.for generating an interrupt to be sent to each of the processor means associated with the SETN register means that compare to the value in the SETI register means or the process number for any computer processor having a valid event request in the FIR event means.

19. The fast interrupt mechanism of claim 17 wherein the interrupt interconnection means comprises:

means associated with the arbitration node means for writing a value to the SETI register means;

means separate from the arbitration node means for transmitting a valid event request signal to the FIR means indicating that an event request has occurred for that processor means; and means separate from the arbitration mode means for receiving interrupts from the comparison means and for sending the interrupts to the processor means to be interrupted.

* * * * *

UNITED STATES PATENT AND TRADEMARK OFFICE
CERTIFICATE OF CORRECTION

PATENT NO. : 5,193,187

DATED : March 9, 1993

INVENTOR(S) : Robert E. Strout, II et al.

It is certified that error appears in the above-indentified patent and that said Letters Patent is hereby corrected as shown below:

Column 2, Line 12, please delete "wave reaches" and insert --system reaches-- therefor.

Column 4, Line 50, please delete "20c, 20c" and insert --20b, 20c-- therefor.

Column 5, Line 11, please delete "(SET)" and insert --(SETI)-- therefor.

Column 14, Line 38, please delete "comparsion" and insert --comparison-- therefor.

Column 16, Line 7, please delete "mode" and insert --node-- therefor.

Signed and Sealed this

Twenty-fifth Day of June, 1996

Attest:

BRUCE LEHMAN

*Attesting Officer*      *Commissioner of Patents and Trademarks*